United States Patent [19]

von Maydell

[11] Patent Number: 4,938,115
[45] Date of Patent: Jul. 3, 1990

[54] ARRANGEMENT IN A FLYING WEAPONS CARRIER FOR COMBATING GROUND TARGETS

[75] Inventor: Ignaz von Maydell, Munich, Fed. Rep. of Germany

[73] Assignee: Messerschmitt-Bölkow-Blohm Gesellschaft mit beschrankter Haftung, Munich, Fed. Rep. of Germany

[21] Appl. No.: 357,639

[22] Filed: May 24, 1989

Related U.S. Application Data

[63] Continuation of Ser. No. 116,022, Jan. 23, 1980, abandoned.

[51] Int. Cl.$^5$ .............................................. F41F 3/06
[52] U.S. Cl. ....................................................... 89/1.51
[58] Field of Search ................................. 89/1.51, 1.56

[56] References Cited

U.S. PATENT DOCUMENTS

| | | | |
|---|---|---|---|
| 1,621,654 | 3/1927 | Boos | 89/1.5 R |
| 2,330,815 | 10/1943 | Dunajeff | 89/1.5 R |
| 2,470,120 | 5/1949 | Walker | 89/1.51 |
| 2,723,093 | 11/1955 | Price et al. | 89/1.5 R |
| 3,308,719 | 3/1967 | Myers | 89/1.5 R |
| 3,379,096 | 4/1968 | Gillham et al. | 89/1.5 R |
| 3,547,000 | 12/1970 | Haberkorn et al. | 89/1.5 R |
| 4,494,437 | 1/1985 | Von Maydell | 89/1.51 |

FOREIGN PATENT DOCUMENTS 1604960 8/1972 France .

OTHER PUBLICATIONS

"Die deutschen Flugzeuge, 1933–1945", pp. 927–929, 1964.

*Primary Examiner*—Charles T. Jordan
*Attorney, Agent, or Firm*—Toren, McGeady & Associates

[57] ABSTRACT

In an arrangement for combatting ground targets by a projectile launched from a flying weapons carrier, a launching device is located in the weapons carrier for directing the projectile in a downward and rearwardly inclined direction relative to the flight direction of the weapons carrier. An aiming system connected to control units adjusts the horizontal velocity of the weapons carrier to the same magnitude as the oppositely directed ejection velocity of the projectile. The projectile can be released in the nadir above the target.

10 Claims, 1 Drawing Sheet

ARRANGEMENT IN A FLYING WEAPONS CARRIER FOR COMBATING GROUND TARGETS

This is a continuation of application Ser. No. 116,022, filed Jan. 23, 1980, now abandoned.

The invention relates to an arrangement for combatting ground targets by means of projectiles ejectable from a flying weapons carrier.

Remote-controlled or self-guided, flying weapons carriers, such as aircraft or rockets, which are equipped with ammunition which can be dropped or discharged for combatting ground targets, require complicated systems for releasing the weapons in order to obtain a hit accuracy as high as possible.

For this purpose, a number of measurement values must be measured exactly, and a number of conditions must be met with high accuracy. In their totality, this is only insufficiently possible by means of known systems in weapons carriers which approach the target with a high speed and in low-level flight. Particularly, even small errors in the determination of the flying altitude result in great deviations from the target when bombs are dropped at high-speed, low-level flight because of a great velocity component of the bomb in the direction of flight; as a result, for a successful combat of targets, it is necessary to use large amounts of ammunition in relatively heavy and expensive aircraft.

For an arrangement of the above-mentioned type, the object of the invention is to construct this arrangement so that a high hit accuracy is obtained during high-speed, low-level flight while requiring relatively uncomplicated technical apparatus for an ejectable projectile.

In accordance with the invention, this object is met thereby that the flying weapons carrier has an aiming system to which control units are connected by means of which the horizontal velocity $V_h$ of the weapons carrier can be adjusted so as to have the same magnitude of the oppositely directed ejection velocity $-V_h$ of a projectile and by means of which the projectile which can be ejected from a launching device at a downwardly inclined angle can be released in the nadir above the target. The resulting, from steeply to perpendicularly downwardly directed, ballistics have the result that the flying altitude, even when determined incorrectly, does not or only slightly enters into the miss distance.

On the other hand, the time of release is to be determined with high accuracy with sufficiently controllable means and a predetermined ejection velocity of the projectile is also to be maintained accurately with uncomplicated means, whereby it is generally possible, by means of the above-described arrangement, to obtain significantly smaller miss distances than with conventional arrangements, particularly also during low-level flight and in the case of unfavorable weather conditions. In this connection, relatively simple and inaccurate altimeter systems can be used for the aiming system as well as for the guidance of the missiles.

In accordance with a further development of the invention, a computer is assigned to the launching device which computer determines the time of release for the launching device in dependence upon a residual difference between the horizontal velocity $V_h$ of the weapons carrier and a predetermined horizontal and oppositely directed ejection velocity $-V_h$ of the projectile.

In an advantageous further development of the invention, the weapons carrier is equipped with an autopilot controlled by the computer, the autopilot being provided with units for maintaining a predetermined flying altitude and horizontal speed. The two last-mentioned conditions can be realized with relatively simple, known means.

In accordance with a special further development of the invention, the hit accuracy is further significantly improved by providing the weapons carrier with a unit for the continuous determination of the propagation time of electromagnetic waves which are transmitted from at least two control points, and with a unit for comparing these measured propagation times to additional equivalent target coordinates which are introduced into a storage of the weapons carrier, the latter unit being assigned to the computer which determines therefrom the actual position values of the weapons carrier and the horizontal distance and the direction of the target.

It has been found in this connection that, in accordance with a further development of the invention, target coordinates which are obtained in an analog manner by means of a reconnaissance missile and are introduced into the storage of the weapons carrier result in a higher hit accuracy than comparative data taken from maps.

Furthermore, in another embodiment of the invention, the arrangement is constructed in such a way that a constant ejection velocity of the ammunition is ensured by an appropriate design of the propellant charges and the flying speed of the weapons carrier, controlled by the computer, is adjusted to this ejection velocity. In this connection, by means of a switching unit assigned to the comparator and the autopilot, it is sufficient to control the flying speed precisely only in the vicinity of the target by means of the mentioned units, while simple flight controls are effected on the take-off distance and the approach distance. This measure makes it possible to use relatively simple means which are already known in measuring techniques and control engineering. Proven techniques which ensure a recoilless operation are advantageously used in constructing the propellant charges for the ejectable projectile.

In another embodiment of the invention, for error correction, it can be further provided, at least in the vicinity of the target, to control by means of the computer the angle of inclination of the launching device and/or the flight path of the weapons carrier and its drift angle.

Further details of the invention are described in the following with the aid of the embodiments illustrated in the drawing. In the drawing.

Figure 1:
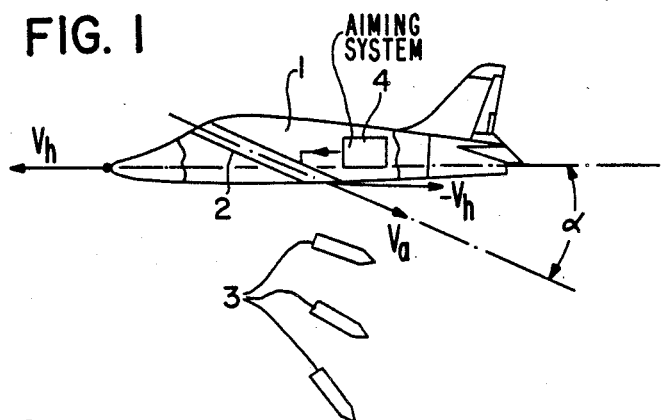
FIG. 1 shows a schematically simplified, flying weapons carrier in a longitudinal section, with the arrangement for combatting ground targets mounted in the weapons carrier.

The flying weapons carrier illustrated in FIG. 1 is equipped with a known propulsive unit, not shown, for example, a relatively simple air-breathing unit whose thrust can be controlled and is provided with devices for remote control which are also known. For combatting ground targets, it has a launching device 2 which is arranged in the opposite direction of its direction of flight and is inclined downwardly by an angle α. A projectile 3 can be ejected with a horizontal velocity component $-V_h$ from this launching device, however, this component $-V_h$ has the same magnitude, but is directed opposite the horizontal velocity component $V_h$ of the weapons carrier 1. For the flight path of the projectile 3, this results in ballistics directed downwardly from very steeply to perpendicularly, and simple reflections show that, contrary to conventional dropping and discharging devices which are directed in the direction of flight or downwardly, the flying altitude above the target is of subordinate importance for an exact combat of targets. On the other hand, the speed of the weapons carrier itself is to be controlled with conventional and relatively simple means exactly in such a way that it corresponds to an ejection velocity $V_a$ of the projectile 3 which is also to be kept constant with relatively uncomplicated means. Compared to known arrangements for combatting ground targets, the above results in a significantly increased hit accuracy, particularly also in those cases when the weapons carrier flies at a high speed and a relatively low altitude above the ground.

Figure 2:
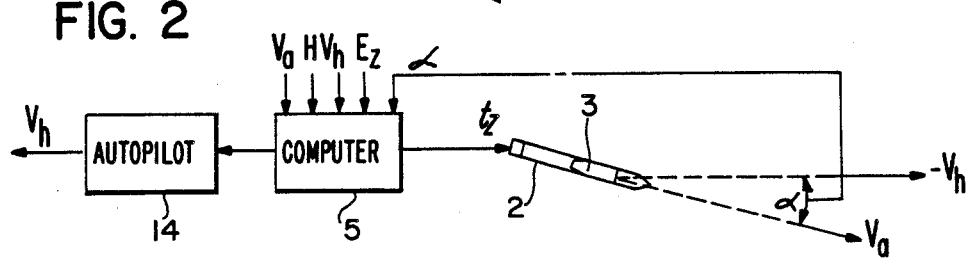
FIG. 2 is a block diagram of the arrangement according to FIG. 1.

The projectile 3 is advantageously launched by means of another embodiment of the device 2 and the aiming system 4, illustrated in FIG. 2, according to which the ignition time $t_Z$ is determined by means of a computer 5 into which are introduced, through known electronic means, the data concerning horizontal velocity $V_h$, target distance $E_Z$ of the weapons carrier 1, the ejection velocity $V_a$ and the angle of inclination α of the launching device 2, wherein the latter is possibly adjustable by means of known control units. To the computer 5 there is further connected an autopilot 14, known per se, for guiding the weapons carrier, the autopilot 14 being controlled additionally in accordance with the data present in the computer which had been introduced through appropriate, known means. Relatively inaccurate measuring devices, for example, a barometric altimeter, may serve for introducing the flying altitude.

Figure 3:
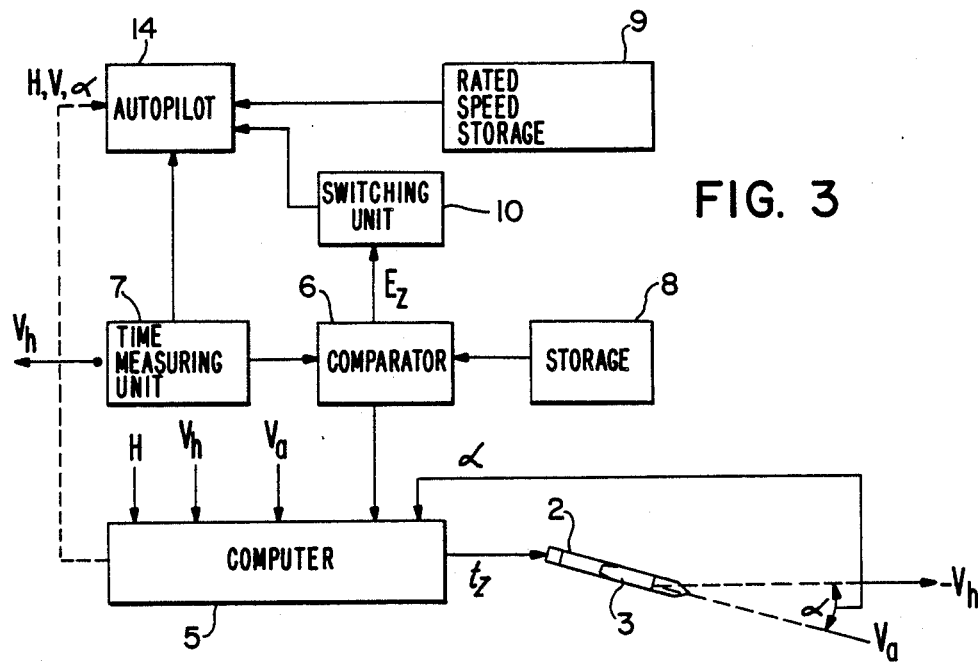
FIG. 3 is an expanded block diagram of the arrangement according to FIG. 2.

For a further improvement of the hit accuracy, special navigation units, illustrated in FIG. 3, are assigned to the computer 5; these units are extensively described in the older German patent application No. P 25 32 479.2. In this case, information concerning the target distance $E_Z$ is fed to the computer 5 from a comparator 6 which is connected to a unit for measuring the propagation time 7 for electromagnetic waves and a storage 8 for the propagation time coordinates of the target. The unit for measuring the propagation time 7 consists essentially of a receiver which receives signals which are transmitted simultaneously or alternatingly from two antennas, while analog target coordinates obtained by means of a reconnaissance missile are present in the propagation delay storage 8. The signals obtained from the two units 7 and 8 are converted in the comparator 6 into target distance signals $E_Z$ and are fed to the computer 5. For the weapons carrier 1, this results in a continuous, highly accurate navigation which exceeds the accuracy of maps while requiring relatively uncomplicated means.

The unit for measuring the propagation time 7 is further provided with signals which are supplied to the autopilot 14 through the computer 5 and, thus, are utilized for the self-guidance of the weapons carrier 1 toward the target.

The autopilot receives signals for controlling the flying altitude H from the altimeter and, from the computer, the signals for controlling the speed V of the weapons carrier and for maintining the angle of inclination α at the moment of the ignition time $t_Z$ for the launching device 2, wherein a rated speed storage 9 is assigned to the computer.

In this manner, by means of a known propulsion unit control, not shown, or through decelerating means (spoilers), also known, the autopilot causes the horizontal velocity $V_h$ of the weapons carrier 1 to coincide with the predetermined horizontal component of the ejection velocity $V_a$ of the projectile 3. For this purpose, a switching unit 10 is provided which, when a predetermined target distance is reached, is able to switch off, by means of a signal supplied from the comparator 6, the speed control units assigned to the autopilot 14.

Because of the very short falling time of the projectile, head wind and tail wind have practically no influence on the hit accuracy. In contrast, the influence of cross winds, for example, by drifting of the weapons carrier, causes a deviation from the target which is eliminated by assigning means, known per se, to the aiming system 4 for taking into consideration the influence of the cross winds; as a result, the condition is once again met that the horizontal speed of the weapons carrier is equal to the oppositely directed horizontal speed of the projectile.

The entire arrangement for combatting ground targets and also for the guiding unit of the weapons carrier is relatively uncomplicated, particularly because of the use of an aiming system with perpendicular weapons ballistics in connection with a unit for measuring the propagation time. In the past, a comparable hit accuracy was not possible during high-speed, low-level flight, even with significantly more complicated means and with the use of large or manned aircraft. It is another advantage in this arrangement that only altimeters of relatively low accuracy, for example, barometric altimeters are required. Compared to missiles for one-way missions, another advantage of the arrangement resides in the fact that a flying weapons carrier is able to successively drop projectiles on spatially separated targets. For this purpose, for example, a rechargeable launching device 2 or a multiple arrangement of launching devices can be provided.

What is claimed:

1. Arrangement for combatting ground targets by launching a projectile from a flying weapons carrier, comprising:
   means for flying the weapons carrier in a first direction over the target,
   a launching device on the weapons carrier and positioned to launch the projectile at a substantially constant ejection velocity downwardly and in a second rearwardly direction opposite to the first direction such that said ejected projectile has a horizontal velocity component in the second direction,
   means for controlling the angle of inclination of the launching device relative to the target,
   an aiming system having control units connected to the weapons carrier and to the angle-controlling means of the launching device,
   said control units being operable to control the horizontal velocity of the weapons carrier in the first direction and the angle-controlling means of the launching device such that the projectile can be released in the nadir above the target and to increase the likelihood of the projectile striking the target.

2. The arrangement of claim 1, wherein said control units are operable to control the horizontal velocity of the weapons carrier in the first direction to substantially match the horizontal velocity component of the ejected projectile in the second direction.

3. The arrangement of claim 2, wherein the control units are operable to cause the projectile to follow a steeply to vertically downward ballistic trajectory.

4. The arrangement of claim 3, wherein said aiming system further includes a computer for determining the release time for said launching device in accordance with any residual difference between the horizontal velocity of said weapons carrier and a predetermined horizontal velocity component of the ejected projectile in the second direction.

5. The arrangement of claim 4, further comprising an autopilot controlled by said computer for maintaining a predetermined flying altitude and horizontal velocity.

6. The arrangement according to claim 3, further comprising a computer having storage means, means for the continuous determination of the propagation times of electromagnetic waves which are transmitted from at least two points, and means for comparing these determined propagation times to additional equivalent target coordinates stored in the storage means, said computer being operable to determine the actual position values of said weapons carrier and the horizontal distance and the direction to the target.

7. The arrangement of claim 6, wherein the said target coordinates are derived from stored propagation time measurements obtained from reconnaissance missiles.

8. Arrangement according to claim 6, further comprising an autopilot having flying speed control units and connected to said computer for maintaining a predetermined flying altitude and horizontal velocity, and a switching unit connected to said comparing means and operable to switch on the flying speed control units of said autopilot when a predetermined target distance has been reached.

9. Arrangement according to claim 3, wherein said aiming system is operable to control the angle of inclination of said launching device or the flying path of said weapons carrier when in the vicinity of the target.

10. Arrangement according to claim 3, wherein said aiming system further comprises means for correcting for cross wind influences.

* * * * *